United States Patent [19]

Batchelder et al.

[11] Patent Number: 5,194,912

[45] Date of Patent: Mar. 16, 1993

[54] RAMAN ANALYSIS APPARATUS

[75] Inventors: David N. Batchelder; Chunwei Cheng; Brian J. E. Smith, all of London, England

[73] Assignee: Renishaw plc, Gloucestershire, United Kingdom

[21] Appl. No.: 543,729

[22] PCT Filed: Dec. 22, 1989

[86] PCT No.: PCT/GB89/01532

§ 371 Date: Aug. 6, 1990

§ 102(e) Date: Aug. 6, 1990

[87] PCT Pub. No.: WO90/07108

PCT Pub. Date: Jun. 28, 1990

[30] Foreign Application Priority Data

Dec. 22, 1988 [GB] United Kingdom ............... 8830039

[51] Int. Cl.$^5$ .............................................. G01J 3/44
[52] U.S. Cl. .................................................... 356/301
[58] Field of Search ........................................ 356/301

[56] References Cited

U.S. PATENT DOCUMENTS

| | | | |
|---|---|---|---|
| 3,625,613 | 12/1971 | Abell et al. ................ | 356/301 |
| 3,914,055 | 10/1975 | Wolga et al. .............. | 356/301 |
| 3,999,854 | 12/1976 | Barrett . | |
| 4,030,827 | 6/1977 | Delhaye et al. ............ | 356/301 |
| 4,081,215 | 3/1978 | Penney et al. ............. | 356/45 |
| 4,397,556 | 8/1983 | Muller ....................... | 356/301 |
| 4,586,819 | 5/1986 | Tochigi et al. ............ | 356/301 |
| 4,648,714 | 3/1987 | Benner et al. ............. | 356/301 |

FOREIGN PATENT DOCUMENTS 1577198 10/1980 United Kingdom .

OTHER PUBLICATIONS

Flaugh et al, "Development of a New Optical Wavelength Rejection Filter: Demonstration of its Utility in Raman Spectroscopy", Applied Spectroscopy, vol. 38, #6, Nov.-Dec./1984.

Batchelder, "Multichannel Raman Spectroscopy with a Cooled CCD Imaging Detector," ESN-European Spectroscopy News, 80, 1988, pp. 28, 32, 34.

"Crystalline Colloidal Bragg Diffraction Devices", Asher et al, Spectroscopy vol. 1 No. 12, 1986, pp. 26-31.

"Laser Molecular Microprobe", P. Dhamelincourt, source unknown, pp. 48-53.

"Raman Microprobe and Microscope with Laser Excitation", M. Delhaye and P. Dhamelincourt, Journal of Raman Spectroscopy, 3(1975) 33-43.

"Laser Raman Spectrometer for Process control", A. M. Karger et al Applied Optics, vol. 12, No. 9, Sep. 1973, pp. 2083-2087.

"Optical Determination of Crystal Axis Orientation in Silicon Fragments or Devices", IBM Technical Disclosure Bulletin, vol. 27, No. 7A, Dec. 1984.

"Imaging Biological Compounds Using the coherent Anti-Stokes Raman Scattering Microscope", M. D. Duncan et al, Optical Engineering, vol. 24, No. 2, Apr. 1985, pp. 352-355.

Primary Examiner—F. L. Evans
Assistant Examiner—K. P. Hantis
Attorney, Agent, or Firm—Oliff & Berridge

[57] ABSTRACT

A sample (14) is illuminated by light from a laser source (16), which is reflected to it by a dichroic filter (18) and passed through a microscope objective (20). The microscope objective (20) focusses a two dimensional image of the illuminated area onto a detector (22). On the way to the detector (22), the light passes through an interference filter (26), which selects a desired line from the Raman spectrum scattered by the sample (14). The filter (26) can be tuned to any desired Raman line by rotating it through various angles of incidence (Θ), about an axis (28) perpendicular to the optical axis.

25 Claims, 2 Drawing Sheets

RAMAN ANALYSIS APPARATUS

BACKGROUND OF THE INVENTION

This invention relates to apparatus and methods in which the Raman effect is used to analyse a sample.

The Raman effect is a phenomenon in which a sample scatters incident light of a given frequency, into a frequency spectrum which has lines caused by interaction of the incident light with the molecules making up the sample. Different molecular species have different characteristic Raman spectra, and so the effect can be used to analyse the molecular species present.

Analysis methods and apparatus using the Raman effect are described in a paper 'Raman Microprobe and Microscope with Laser Excitation', M Delhaye and P Dhamelincourt Journal of Raman Spectroscopy, 3 (1975) 33–43. A sample is irradiated with monochromatic light from a laser, and the scattered light is passed through a monochromator in order to select a particular line of the resulting Raman spectrum. The paper describes both a microprobe, in which light from a single illuminated point or a line on the sample is passed through the monochromator, and a microscope in which an area is illuminated and an integral, two dimensional image of that area is passed through the monochromator. The microprobe has the disadvantage that in order to obtain a two dimensional image, it is necessary to scan a series of points or lines over the area of the sample, so that building up the required image is complex and may take a relatively long time. The microscope obviously does not suffer from this disadvantage, but the optics of the monochromator require substantial modification in order to pass a two dimensional image.

Specifically, a conventional monochromator has an optical system which focuses an image of the illuminated point or line of the sample onto an entrance slit; and a further optical system which focuses an image of the entrance slit onto an exit slit. Between the entrance slit and the exit slit there is a dispersive device such as a diffraction grating (or commonly two or three such gratings in series). The dispersive device has the effect of splitting an incoming polychromatic light beam into a range of angles, depending on frequency. Because of the dispersion, the position of the exit slit relative to the diffraction grating selects the desired spectral line to be investigated. The monochromator can be tuned to different spectral lines by moving the exit slit, or more conveniently by an arrangement in which the diffraction grating is rotated relative to the exit slit. Because the frequencies of the spectrum are separated by a dispersive process, it is obvious that good frequency resolution requires narrow slits. Since the image of the sample is focused on the slits, this is the reason why this conventional monochromator arrangement cannot observe a two dimensional area of the sample. If a wider slit were used in order to pass a two dimensional image, it would pass a range of frequencies. Because any given spectral line has a finite width, the result is a blurred image of any given point on the sample, and if one attempts to form an image in two dimensions, the blurred image of one point in the sample will overlap with the blurred image of an adjacent point, resulting in a very confused image (poor spatial resolution in addition to degraded frequency resolution).

The modified optical system used in the above paper in order to provide an integral two dimensional image, forms an image of the sample on the diffraction grating of the monochromator, instead of on the entrance and exit slits. At the entrance and exit slits, there are formed images of the exit aperture of an optical microscope which views the area of the sample which is to be imaged. By these means (in theory) one can pass an integral two dimensional image of the area of the sample through a monochromator with arbitrarily narrow entrance and exit slits. However, the aperture size of the entrance slit governs the amount of light which is collected and focused onto the grating; while the aperture size of the exit slit governs the amount of light which is collected from the grating and focused to produce the resulting two dimensional image which is detected. In the result, therefore, if one makes the entrance and exit slits narrow, to improve the frequency resolution, then the intensity of the resulting image is extremely low and difficult to detect. This is exacerbated by the fact that the desired Raman spectra are already of very low intensities, and cannot be increased merely by increasing the incident illumination of the sample by the laser, since increased laser power is likely to destroy the sample. Accordingly, commercial Raman analysis devices have tended to be of the scanning microprobe type, rather than a Raman microscope in which an integral two dimensional image is formed.

SUMMARY OF THE INVENTION

The present invention is based upon the realisation by the inventor that if one uses a non-dispersive filter rather than a dispersive monochromator, there is no need for narrow entrance and exit slits to provide adequate frequency resolution. The above-noted paper does indeed briefly suggest that the optical system could be simplified by using a fixed wavelength interference filter, with the use of a tunable dye laser in order to tune the system to different Raman lines, but the authors state that this experiment did not succeed.

One aspect of the present invention provides Raman analysis apparatus comprising:
  means for illuminating a sample so as to produce therefrom a Raman spectrum,
  tunable means for selecting a desired frequency of said Raman spectrum received from the sample, and
  a detector for detecting the light selected by the tunable means,
  characterised in that said tunable means comprises non-dispersive filter means for selecting the desired frequency without splitting differing frequencies into a range of angles.

Such apparatus may form either a Raman microscope or a Raman microprobe.

Preferably the filter means comprises an interference filter, such as a dielectric filter, and preferably it is tuned by altering the angle of incidence of the light scattered by the sample onto the filter. This may be done by making the filter rotatable about an axis perpendicular to the optical axis, to the required angles of incidence.

In another aspect, the invention provides a method of analysing a sample using such apparatus.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
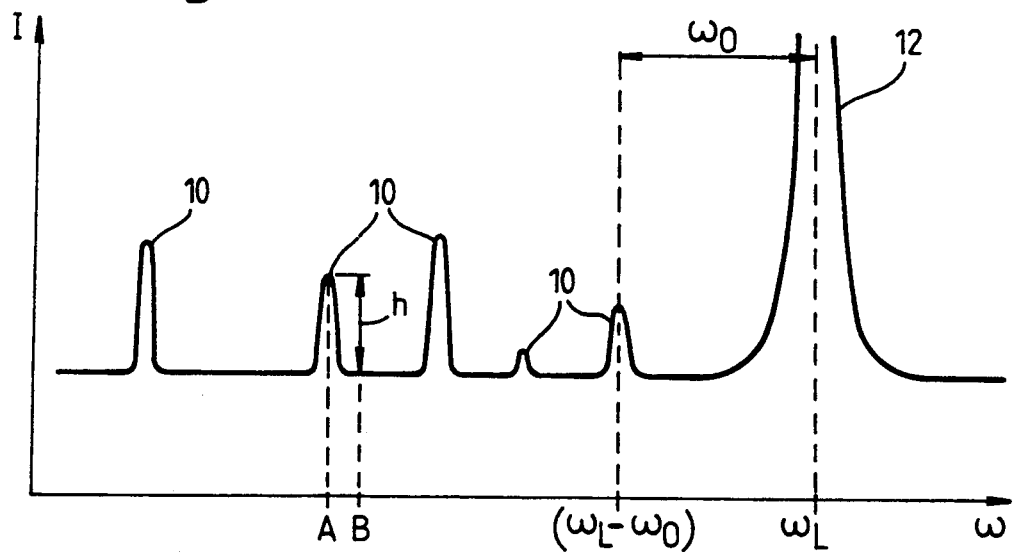
FIG. 1 is a graph showing a Raman spectrum.

The Raman effect will first be briefly explained. If a sample is illuminated by monochromatic light of frequency $\omega_L$, eg. from a laser, light will be scattered. The graph of FIG. 1 shows the frequency $\omega$ of the scattered light, against intensity I. Most of the light is scattered by Rayleigh scattering, giving a peak 12 at frequency $\omega_L$, but small quantities of light are scattered at other frequencies because of various effects, including fluorescence and the Raman effect. The Raman effect is caused by the various natural frequencies of interatomic vibration within the molecules which make up the sample. FIG. 1 shows a number of Raman lines 10, at frequencies ($\omega_L-\omega_o$), where $\omega_o$ is the natural frequency of a molecular vibration. Any given species of molecule will have a characteristic set of Raman lines, which can be used to identify the composition of the illuminated surface of the sample (or of the interior of a transparent sample). Such use of the Raman effect for analysis of a sample is already well understood. Performing an analysis involves measuring the frequencies and relative heights h of the peaks 10, in order to be able to match the observed spectrum with the known spectra of various molecules.

Figure 2:
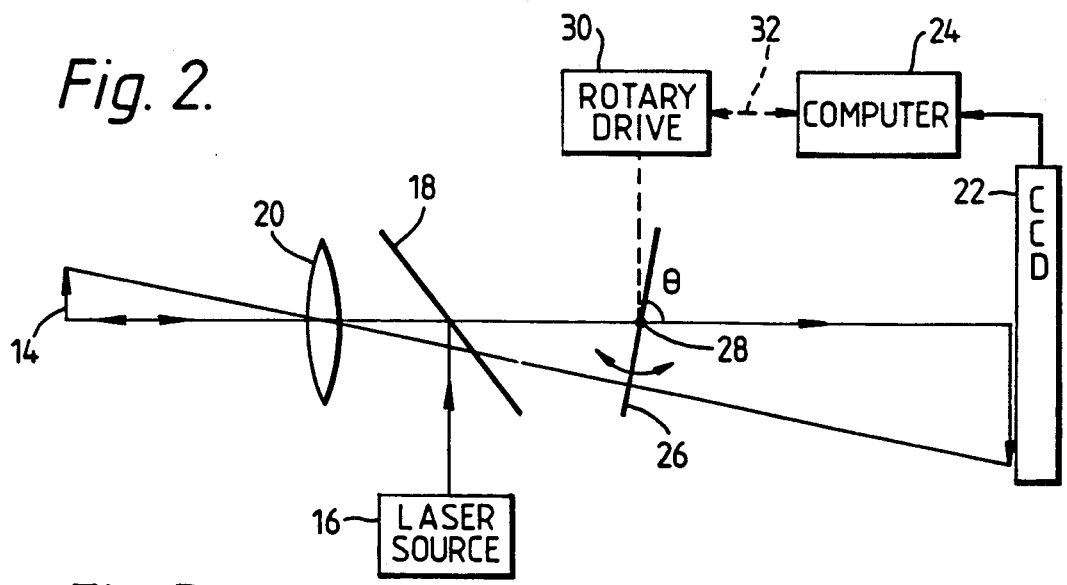
FIG. 2 is a schematic diagram of a simple embodiment of the invention.

FIG. 2 shows schematically an apparatus according to the invention for performing such analysis. A sample 14 is illuminated over a two dimensional area of its surface by a monochromatic laser source 16. The laser beam is reflected from the source to the sample by a dichroic interference filter (in this case a multilayer dielectric filter) 18, which is designed to transmit all frequencies except the very narrow line of the monochromatic laser source 16. A half-silvered mirror could be used in place of the filter 18, though this entails a loss of light level. The laser beam also passes through a microscope objective 20, which is represented in the drawing as a single lens, but which may well comprise a system of several lenses in well known manner. The laser source 16 may use a laser of any suitable type, e.g. a He-Ne laser, but if it is an ion laser it should include an appropriate filter to remove plasma lines.

The microscope objective 20 focuses a two dimensional image of the illuminated area 14 of the sample onto a camera 22. The camera 22 is preferably a charge coupled device (CCD), cooled to cryogenic temperatures (eg. by liquid nitrogen or by Peltier cooling) in order to eliminate dark current and thereby improve the signal to noise ratio of the apparatus. The use of CCD's in conventional Raman spectroscopy is described in a paper 'Multichannel Raman Spectroscopy with a Cooled CCD Imaging Detector', D N Batchelder, ESN—European Spectroscopy News, 80 (1988), pages 28,32,33. The output of the CCD 22 is taken to a computer 24, which is used both for data collection from the CCD and for analysis of the resulting images. Other cameras could of course be used in place of the CCD 22, such as an intensified video camera.

Between the filter 18 and the CCD 22, there is placed a second line filter 26. This is again a dielectric interference filter. Unlike the filter 18, however, the filter 26 is arranged to transmit only the frequency ($\omega_L-\omega_o$) of a Raman line of interest, and to reject all other frequencies. In the rejection of other frequencies, it is of course assisted by the filter 18 which has already rejected much of the exciting frequency $\omega_L$.

Thus, the image which is focused on the CCD 22 is a two dimensional image of the scattering at the selected Raman frequency $\omega_L-\omega_o$, over the illuminated area of the sample 14. This image has excellent spatial resolution, limited only by the quality of the microscope objective 20 and the resolution of the CCD 22. The computer 24 is programmed to record the intensity of the selected Raman peak 10 for each pixel of the two dimensional image received by the CCD.

The filter 26 is arranged for pivotal movement about an axis 28, perpendicular to the optical axis, through an angle $\Theta$. This allows us to make use of a property of such interference filters, namely that the frequency of the line transmitted by the filter varies with the angle of incidence $\Theta$. Thus, by adjusting the angle 8, the apparatus can be tuned to select different peaks 10 within the spectrum of FIG. 1. Also, by tuning first to a frequency A on one of the peaks 10, and taking an intensity reading for each pixel of the image, then tuning to an adjacent frequency B and repeating the intensity measurements, the computer 24 can calculate the height h of the peak, simply by subtracting one reading from the other, for each pixel of the image.

The filter 26 is tuned by turning it to the required angle $\Theta$ by means of a rotary drive 30. At its simplest, this may simply comprise a manual adjustment device, such as a knob, optionally with a pointer to a scale indicating the angle $\Theta$ (which may be calibrated in terms of the wave number in $cm^{-1}$). Preferably, however, the drive means 30 is a motorised rotary drive, eg. a stepping motor. Optionally, this may be controlled by the computer 24, as indicated by a broken line 32. This enables the computer 24 to be programmed with a predetermined analysis procedure, so that the analysis can proceed entirely automatically. In such a mode, the computer 24 adjusts the angle of incidence 8 to a first pre-determined Raman frequency, gathers and stores data from the CCD 22 relating to the two dimensional image at that Raman frequency, and then repeats this procedure for each of a number of different pre-determined Raman frequencies. The computer programme can then automatically perform any desired analysis, such as the simple analysis described above of subtracting the readings at a frequency A from those at a frequency B. It can also compare the Raman spectrum it has detected for each pixel in the image with data prestored in a data bank relating to the known Raman spectra of different molecular species, so as to make a determination as to which species are present.

The rotary drive 30 may include not only a motor controlled by the computer 24, but also an angular position encoder which provides feed-back of the current angular position $\Theta$ to the computer, in order to provide servo control of the angle $\Theta$.

Alternatively, if desired, the rotary drive for the filter 26 may comprise an oscillator, which oscillates the filter through a range of angles 0. This range of angles may be chosen so as to include the two points A and B in FIG. 1. The computer 24 is then programmed to sample the output of each pixel of the CCD 22 over the range of oscillation, and to calculate the peak to peak value of the resulting signal for each pixel. This gives an easy method of determining the height h of the peak 10.

The interference filters 18, 26 can be obtained commercially, for example from Omega Optical Inc., Brattleboro, Vt., USA. The filter 18 may be obtained off the shelf for any of a variety of frequencies $\omega_L$ corresponding to the commonly used laser excitation frequencies. The filter 26, however, has to be specifically designed to transmit the desired Raman frequency (or rather, range of Raman frequencies varying with angle Θ). However, the design and supply of such filters to any desired frequency is a commercially available service from companies such as Omega Optical Inc.

It will be noted that the filters 18, 26 being interference filters, are not dispersive (that is, they do not disperse light of varying frequencies into a corresponding range of directions). It is this feature which gives the present apparatus its good spatial resolution, albeit at the expense of some degree of frequency resolution when compared with conventional dispersive monochromator apparatus. This is achieved without significant reduction of the intensity of the Raman line being investigated. With currently available commercial interference filters, it may be necessary to provide perhaps 4 or 5 interchangeable filters 26, in order to cover the range of frequencies of interest. This is because an individual such filter cannot be tuned over the entire likely range of frequencies by altering the angle Θ. To this end, the filter 26 is preferably arranged in an appropriate mount so as to facilitate its removal and replacement. Alternatively, such removal and replacement may be performed by an automatic changing device under the control of the computer 24.

Other non-dispersive filters may be used in place of the dielectric filter 26. For example, a Fabry-Perot interferometer may be used as such a filter, and may be tuned over the desired range of frequencies by adjusting the spacing of its plates, or by altering the refractive index of the medium between the plates (eg. by adjusting the pressure of a gaseous medium). As the filter 18, one could use a crystalline colloidal Bragg diffraction device as described by Asher et al., Spectroscopy, Vol. 1 No. 12, 1986, pp 26-31. Such devices are available from EG & G Princeton Applied Research, Princeton, N.J., USA.

Figure 3:
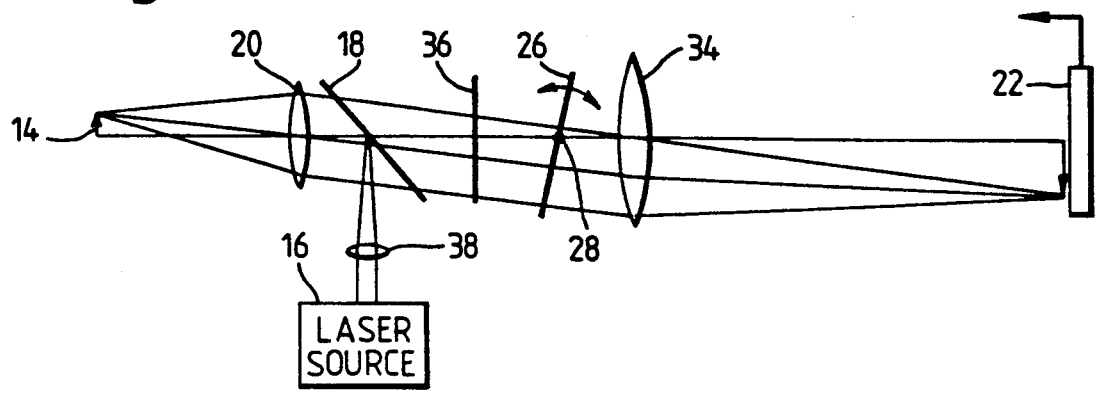
FIGS. 3 and 4 are schematic diagrams illustrating further embodiments.

FIG. 3 shows an embodiment of the invention with an alternative optical arrangement. Here, the sample 14 is placed in the focal plane of the microscope objective 20. Thus, the microscope objective 20 does not directly focus an image of the sample onto the CCD 22, but instead produces a parallel beam of light in respect of any given point on the sample. This is focused by a further lens or lens system 34 to produce the required two dimensional image on the CCD. The additional lens 34 is placed after the filter 26 which is tuned to the desired Raman frequency as described above in respect of FIG. 2.

It will be appreciated that since the sample 14 is now in the focal plane of the microscope objective 20, the parallel beam of light produced by the laser source 16 would illuminate only a single point on the sample, and not provide illumination over a two dimensional area as required. This is overcome by providing a convergent or divergent illumination beam, so that the laser source 16 is focused either behind or in front of the surface of the sample 14. The angle of divergence or convergence of the incident beam is matched to the size of the area of the sample which is to be illuminated. As an example, FIG. 3 illustrates that the parallel laser light is formed into a convergent beam by a convex lens 38. Although not essential, the Figure illustrates that this convergent beam is focused on a central point of the filter 18. In this case, the filter 18 may if desired be provided with a small metallised spot at its central point, to improve the reflectance of the incident laser beam and prevent damage to the filter. In this case, it is desirable to include a filter in the laser source 16 to reject any spurious radiation from the laser source.

FIG. 3 also shows an optional further filter 36 placed in the light path after the filter 18. Like the filter 18, the filter 36 is arranged to reject only the excitation frequency $\omega_L$. By providing better rejection of the excitation frequency, the signal to noise ratio of the apparatus is improved.

The apparatus described above is arranged as a Raman microscope, passing a two dimensional image. However, it can easily be modified for use as a Raman microprobe. This is done by providing a parallel input laser beam, which is focussed to a point on the sample 14 by the microscope objective 20. The resulting image is focussed onto a small group of pixels on the CCD 22. The computer 24 averages the outputs of these pixels. This gives the intensity of the Raman line selected by the filter 26. The apparatus can be tuned to the various Raman lines of interest by rotating the filter 26, as previously. The sample 14 may, if desired be mounted on a table which is slidable in two orthogonal directions X and Y, so that the spot of this Raman microprobe can be scanned across the area of the sample, in a generally conventional manner.

The apparatus described can also easily be modified for analysing the fluorescence of the sample. This is achieved simply by replacing the tunable filter 26 with a more broad band filter appropriate for fluorescence work.

A microprobe as described above with an X-Y scanning arrangement is also useable for contour scanning work, to determine the shape and dimensions of the object being studied. For such work, the microscope objective 20 is arranged to produce a slightly defocussed spot on the object 14. The distance of the illuminated spot on the object 14 from the microscope objective 20 then governs the size of the image produced on the CCD 22 (i.e. the number of pixels illuminated by this image). The computer 24 is programmed to determine the size of the image. As X-Y scanning takes place, the size of the image on the CCD 22 will vary with the local height of the illuminated portion of the object 14, and can be determined by the computer. This makes a powerful analysis tool which can determine both the shape and contour and also the local composition of the object 14.

In either of the embodiments shown in FIGS. 2 and 3, when the filter 26 is rotated the image is displaced slightly because of the refraction in the glass substrate. This can be corrected mechanically by having a counter-rotating piece of glass of the same optical thickness in the beam, as discussed below in relation to FIG. 4, or by shifting the image appropriately by means of software in the computer.

If desired, the filter 26 can be removed so as to produce an ordinary optical image of the sample on the CCD. This enables features found in the Raman images to be referenced to the position as seen in the ordinary optical image. The sample can be illuminated with an additional white light source for this purpose, if desired.

In another modification, the filter 18 may be arranged to transmit the laser frequency $\omega_L$ and reflect all other frequencies, instead of the inverse arrangement shown in FIGS. 2 and 3. In this case, the light from the source passes through the filter 18 in a straight line to the sample 14, and the filter 26, CCD, etc. are arranged at right angles to this straight line such that the optical path from the sample 14 to the CCD 22 is reflected through an angle of 90° at the filter 18.

Figure 4:
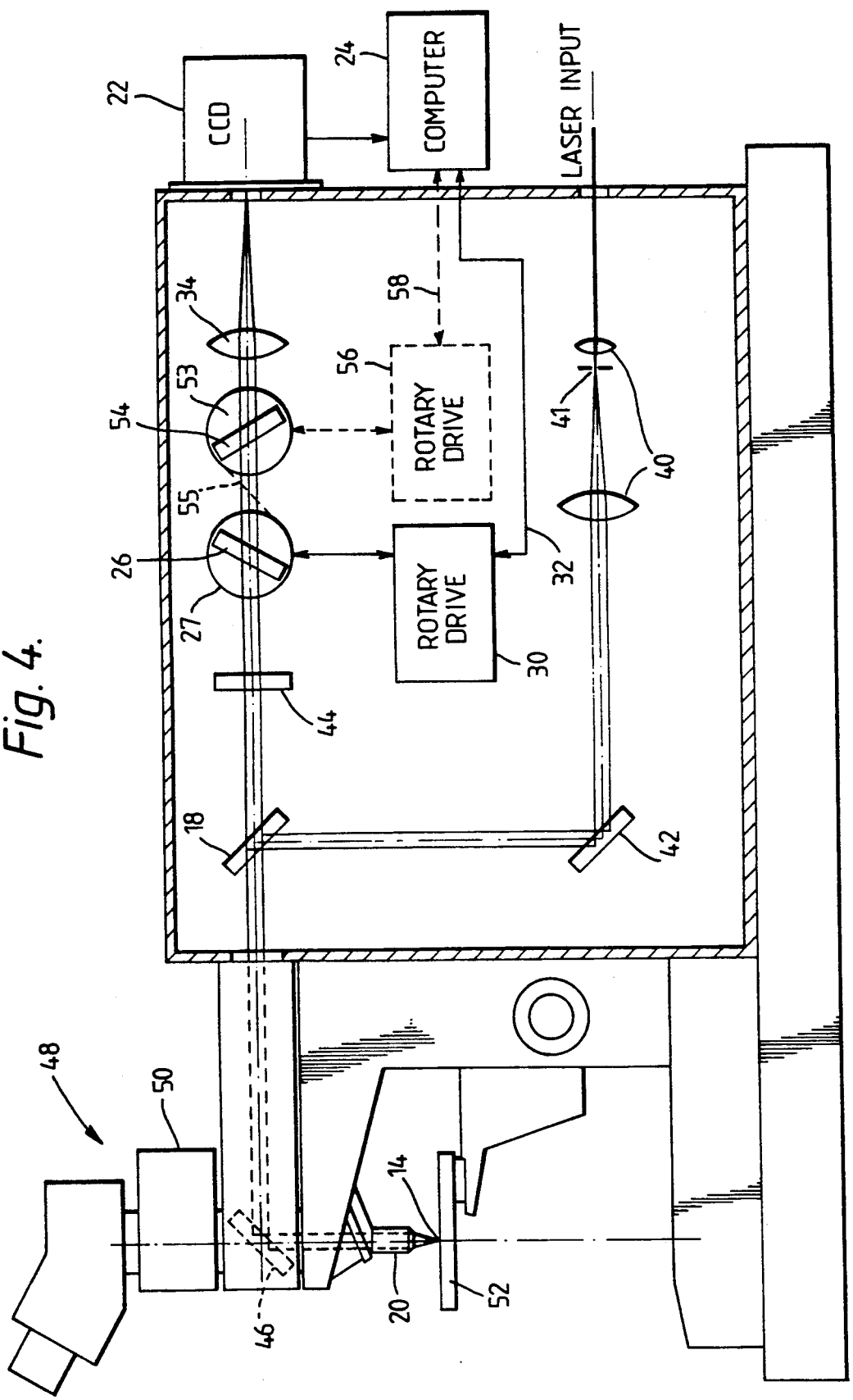

FIG. 4 illustrates a practical embodiment of the apparatus according to the invention. The same reference numerals as in FIGS. 2 and 3 have been used to denote similar features. The laser input passes through a lens system 40, which may include a spatial filter (e.g. a pinhole 41) to improve beam quality. The beam is reflected by a mirror 42 to the filter 18. The microscope objective 20 is provided as part of a conventional optical microscope 48, and a mirror 46 is provided to reflect light to and from the objective 20. The mirror 46 can be removed to permit ordinary use of the optical microscope 48, e.g. to permit setting-up and ordinary optical examination of the sample 14. For these purposes, the microscope 48 has a source 50 of white light for illuminating the sample. The sample 14 is placed upon a movable table 52. As shown, this is simply movable in the vertical direction for focussing purposes; but as discussed above a table can be provided which can also be scanned in horizontal X and Y directions.

An optional polarising filter 44 is provided in the path of the light from the objective 20 to the CCD 22. This can be inserted into or removed from the optical path, and is rotatable about the optical axis to vary the direction of polarisation. This enables investigation of the polarisation state (if any) of the Raman line under investigation, which can yield additional useful information when analysing some materials. The polarising filter 44 may be rotated under the control of the computer 24, if desired, for automatic analysis.

FIG. 4 shows the rotatable, tunable filter 26 mounted on a rotatable wheel 27 for control either manually or by the computer 24 via the rotary drive 30. The figure also shows a second such rotatable wheel 53 for mounting a second filter 54. The wheel 53 is linked to the wheel 27, e.g. by a wire 55, so that it rotates with the wheel 27 but in the opposite direction. In a simple arrangement, the filter 54 is a plain piece of glass, which corrects for the slight displacement of the image on the CCD 22 caused by refraction as the filter 26 rotates. Desirably, however, the filter 54 is another dielectric filter similar to the filter 26, tuned to a slightly different centre frequency but having an overlapping pass band. The result of passing the light through the two filters 26,54 having an overlapping pass band is to enable even more selective tuning to a particular Raman line of interest.

The two filters 26,54 may be so linked that they always have an equal but opposite angle of incidence Θ to the optical axis. In this case, two different filters having two slightly different centre frequencies will be required. Alternatively, however, the two filters may be identical, but the mounting of one of them on the corresponding wheel 27,53 is adjusted so that the two filters have slightly different angles of incidence. This achieves the same effect by reason of the tunable nature of the filters. A further possibility is illustrated in broken lines: in place of the mechanical wire link 55, the wheel 53 has its own rotary drive 56, similar to the drive 30, controlled by the computer 24 via a line 58. Appropriate programming of the computer 24 can therefore set each wheel 27,53 independently to any desired angles of incidence. Producing the desired counter-rotation of one wheel relative to the other, and setting the desired degree of overlapping of the pass bands of the filters 26,54 is a straightforward programming task.

We claim:

1. Raman analysis apparatus comprising:
   means for illuminating a sample so as to produce therefrom a Raman spectrum,
   non-dispersive tunable filter means for selecting a desired frequency of said Raman spectrum received from the sample without splitting differing frequencies into a range of angles, said tunable filter means being continuously tunable over at least a band of said spectrum including a plurality of Raman lines, and
   a detector for detecting the light selected by the tunable filter means.

2. Apparatus according to claim 1, wherein the filter means comprises an interference filter.

3. Apparatus according to claim 2 wherein the filter is a multilayer dielectric filter.

4. Apparatus according to claim 1, wherein the filter means is tunable by altering the angle of incidence of the light scattered by the sample onto the filter means.

5. Apparatus according to claim 4, wherein the filter means is rotatable about an axis perpendicular to an optical axis of the apparatus.

6. Apparatus according to claim 5, including means for counteracting refraction by the filter means as the filter means is rotated.

7. Apparatus according to claim 4, wherein the non-dispersive filter means includes two rotatable filters having different centre frequencies but overlapping pass bands.

8. Apparatus according to claim 1, including a further filter for removing light of an illuminating frequency emitted by the illuminating means from the light received from the sample.

9. Apparatus according to claim 1, wherein the illuminating means illuminates an area of the sample, and a corresponding two dimensional image is produced on the detector.

10. Apparatus according to claim 1, wherein the detector is a charge coupled device.

11. Apparatus according to claim 1, wherein the detector is a charge coupled device.

12. Apparatus according to claim 1, including a spatial filter in the path of light between the illuminating means and the sample.

13. Apparatus according to claim 12, wherein the spatial filter comprises a pinhole.

14. A Raman analysis method comprising:
   illuminating a sample so as to produce therefrom a Raman spectrum,
   using non-dispersive tunable filter means for selecting a desired frequency of said Raman spectrum received from the sample without splitting differing frequencies into a range of angles, said tunable filter means being continuously tunable over at least a band of said spectrum including a plurality of Raman lines, and
   detecting the light selected by the tunable filter means.

15. Raman analysis apparatus comprising:
   means for illuminating an area of a sample so as to produce therefrom a Raman spectrum,
   non-dispersive tunable filter means for selecting a desired frequency of said Raman spectrum received from the sample without splitting differing frequencies into a range of angles, said tunable filter means being continuously tunable over at least a band of said spectrum, and imaging means for producing a two dimensional image of said area of said sample, said image being formed with light selected by said tunable means, and detecting means for detecting said two dimensional image.

16. Apparatus according to claim 15, wherein the filter means comprises an interference filter.

17. Apparatus according to claim 16, wherein the filter means is a multilayer dielectric filter.

18. Apparatus according to claim 15, wherein the filter means is tunable by altering the angle of incidence of the light scattered by the sample onto the filter means.

19. Apparatus according to claim 18, wherein the filter means is rotatable about an axis perpendicular to an optical axis of the apparatus.

20. Apparatus according to claim 19, including means for counteracting refraction by the filter means as the filter means is rotated.

21. Apparatus according to claim 15, wherein the nondispersive filter means includes two filters having different centre frequencies but overlapping pass bands.

22. Apparatus according to claim 15, including a further filter for removing light of an illuminating frequency emitted by the illuminating means from the light received from the sample.

23. Apparatus according to claim 15, including a spatial filter in the path of light between the illuminating means and the sample.

24. Apparatus according to claim 23, wherein the spatial filter comprises a pinhole.

25. A Raman analysis method comprising:
illuminating an area of a sample so as to produce therefrom a Raman spectrum, using non-dispersive tunable filter means for selecting a desired frequency of said Raman spectrum received from the sample without splitting differing frequencies into a range of angles, said tunable filter means being continuously tunable over at least a band of said spectrum, and producing a two dimensional image of said area of said sample, said image being formed with light selected by said tunable means.

* * * * *